US010852427B2

(12) United States Patent
Moskovchenko et al.

(10) Patent No.: US 10,852,427 B2
(45) Date of Patent: Dec. 1, 2020

(54) ULTRASONIC RANGING STATE MANAGEMENT FOR UNMANNED AERIAL VEHICLES

(71) Applicant: GoPro, Inc., San Mateo, CA (US)

(72) Inventors: Stepan Moskovchenko, Belmont, CA (US); Joseph Anthony Enke, Campbell, CA (US)

(73) Assignee: GoPro, Inc., San Mateo, CA (US)

( * ) Notice: Subject to any disclaimer, the term of this patent is extended or adjusted under 35 U.S.C. 154(b) by 519 days.

(21) Appl. No.: 15/639,335

(22) Filed: Jun. 30, 2017

(65) Prior Publication Data
US 2019/0004172 A1 Jan. 3, 2019

(51) Int. Cl.
| | |
|---|---|
| G01S 15/00 | (2020.01) |
| G01S 15/10 | (2006.01) |
| B64C 39/02 | (2006.01) |
| B64D 47/00 | (2006.01) |
| G01S 7/529 | (2006.01) |
| G01S 7/52 | (2006.01) |
| G01S 15/86 | (2020.01) |
| G01S 7/527 | (2006.01) |
| H04L 29/08 | (2006.01) |

(52) U.S. Cl.
CPC ............ *G01S 15/10* (2013.01); *B64C 39/024* (2013.01); *B64D 47/00* (2013.01); *G01S 7/52004* (2013.01); *G01S 7/529* (2013.01); *G01S 15/86* (2020.01); *B64C 2201/127* (2013.01); *B64C 2201/141* (2013.01); *B64C 2201/146* (2013.01); *G01S 7/5273* (2013.01); *H04L 67/12* (2013.01)

(58) Field of Classification Search
None
See application file for complete search history.

(56) References Cited

U.S. PATENT DOCUMENTS 3,329,952 A * 7/1967 Bogle ..................... F42C 13/04
                                                              342/68
4,559,602 A * 12/1985 Bates, Jr. ................ G06F 17/10
                                                              702/71

(Continued)

FOREIGN PATENT DOCUMENTS

GB          1500209 A  *  2/1978  ............. G01S 13/18

*Primary Examiner* — Hovhannes Baghdasaryan
*Assistant Examiner* — Jonathan D Armstrong
(74) *Attorney, Agent, or Firm* — Young Basile Hanlon & MacFarlane, P.C.

(57) ABSTRACT

Ultrasonic ranging state management for a UAV is described. A transducer transmits an ultrasonic signal and receives an ultrasonic response thereto using a gain value. A noise floor estimation mechanism determines a noise floor estimate. A state mechanism sets an ultrasonic ranging state used by the transducer to a first ultrasonic ranging state. The transducer transmits an ultrasonic signal and responsively receive an ultrasonic response to the ultrasonic signal using a gain value according to the noise floor estimate. The state mechanism processes the ultrasonic response to determine whether to determine a new noise floor estimate, adjust the gain value used by the transducer, or change the ultrasonic ranging state of the UAV to a second ultrasonic ranging state. The configurations of the first and second ultrasonic ranging states differ as to, for example, power and gain levels used by the transducer to receive ultrasonic responses.

19 Claims, 8 Drawing Sheets

(56) References Cited

U.S. PATENT DOCUMENTS

| | | | | | |
|---|---|---|---|---|---|
| 4,578,997 | A * | 4/1986 | Soltz | ............... | G01F 23/2962 367/108 |
| 4,701,893 | A * | 10/1987 | Muller | ............... | G01S 15/101 367/137 |
| 4,868,797 | A * | 9/1989 | Soltz | ............... | G01F 23/2962 367/98 |
| 5,075,863 | A * | 12/1991 | Nagamune | ............... | B22D 2/003 342/130 |
| 5,428,999 | A * | 7/1995 | Fink | ............... | G01S 7/52049 73/598 |
| 5,565,870 | A * | 10/1996 | Fukuhara | ............... | G01S 7/2926 342/70 |
| 5,647,366 | A * | 7/1997 | Weng | ............... | G01S 15/58 600/453 |
| 5,764,686 | A * | 6/1998 | Sanderford | ............... | G01S 3/043 375/149 |
| 5,834,877 | A * | 11/1998 | Buisker | ............... | B06B 1/0622 310/322 |
| 6,133,826 | A * | 10/2000 | Sparling | ............... | B60Q 9/007 340/435 |
| 6,606,033 | B1 * | 8/2003 | Crocker | ............... | G06Q 30/02 340/438 |
| 8,103,019 | B1 * | 1/2012 | Pandey | ............... | H04R 3/02 381/93 |
| 8,277,380 | B2 * | 10/2012 | Daft | ............... | B06B 1/064 600/407 |
| 2003/0039171 | A1 * | 2/2003 | Chiapetta | ............... | B62D 61/10 367/98 |
| 2004/0004905 | A1 * | 1/2004 | Lyon | ............... | G01S 7/52004 367/13 |
| 2007/0236374 | A1 * | 10/2007 | Brueske | ............... | G01S 7/52028 341/143 |
| 2007/0280052 | A1 * | 12/2007 | Kong | ............... | G01S 5/26 367/128 |
| 2009/0112096 | A1 * | 4/2009 | Tamura | ............... | A61B 8/06 600/454 |
| 2010/0063397 | A1 * | 3/2010 | Wagner | ............... | A61B 8/4483 600/459 |
| 2011/0080806 | A1 * | 4/2011 | Normann | ............... | G01V 1/46 367/35 |
| 2011/0279366 | A1 * | 11/2011 | Lohbihler | ............... | G01S 5/0247 345/157 |
| 2011/0294449 | A1 * | 12/2011 | Budianu | ............... | G01S 13/765 455/245.1 |
| 2013/0320865 | A1 * | 12/2013 | Murakami | ............... | H05B 37/0227 315/158 |
| 2014/0276065 | A1 * | 9/2014 | He | ............... | A61B 8/5207 600/445 |
| 2016/0068264 | A1 * | 3/2016 | Ganesh | ............... | G06Q 10/0833 701/2 |
| 2017/0167904 | A1 * | 6/2017 | Sathyanarayana | ...... | G01F 1/662 |
| 2018/0374038 | A1 * | 12/2018 | Fry | ............... | G01S 7/5273 |
| 2019/0004172 | A1 * | 1/2019 | Moskovchenko | ...... | G01S 15/10 |
| 2019/0004173 | A1 * | 1/2019 | Moskovchenko | ...... | G01S 15/42 |

* cited by examiner

US 10,852,427 B2

ULTRASONIC RANGING STATE MANAGEMENT FOR UNMANNED AERIAL VEHICLES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to ultrasonic ranging state management for unmanned aerial vehicles (UAVs).

BACKGROUND

UAVs may be used for commercial and recreational purposes. A UAV may include ultrasonic functionality for detecting objects, such as to determine a position of the UAV relative to the object, a distance between the UAV and the object, or the like. Information about detected objects can be useful for other aspects of the UAV. For example, in the context of vision-based navigation, information about the distance between the UAV and a detected object can be used to supplement successive images indicating visual distinctions between observed objects. In another example, in the context of video processing, information about the position of the UAV relative to an object can be successively used to indicate motion. The ultrasonic functionality of a UAV relies upon a transducer transmitting ultrasonic signals using appropriate gain, power, and other values.

SUMMARY

Systems and techniques for ultrasonic ranging state management for UAVs are described below.

One aspect of the disclosure is a method for ultrasonic ranging state management for an unmanned aerial vehicle. The method includes determining a noise floor estimate for gain values for a transducer of the unmanned aerial vehicle based on a binary search performed over a gain space. An ultrasonic ranging state of the unmanned aerial vehicle is set to a long detect state. An ultrasonic signal can be transmitted from the transducer of the unmanned aerial vehicle. The transducer can then receive an ultrasonic response to the ultrasonic signal using a gain value of the gain values. A determination is made as to whether the ultrasonic response to the ultrasonic signal includes a target value. If the ultrasonic response to the ultrasonic signal includes the target value, a determination is made as to whether the target value is inside of a ring-down window associated with the transducer. If the target value is inside of the ring-down window, the ultrasonic ranging state of the unmanned aerial vehicle can be set to a short detect state.

Another aspect of the disclosure is a UAV including a transducer and a signal processor. The transducer is configured to transmit an ultrasonic signal and receive an ultrasonic response to the ultrasonic signal using a gain value. The signal processor includes a noise floor estimation mechanism and a state mechanism. The noise floor estimation mechanism is configured to determine a noise floor estimate for the gain value. The state mechanism is configured to set an ultrasonic ranging state used by the transducer based on the ultrasonic response to the ultrasonic signal. The gain value used by the transducer to receive the ultrasonic response to the ultrasonic signal is adjusted based on the ultrasonic ranging state set by the state mechanism.

Another aspect of the disclosure is a non-transitory computer-readable storage medium, comprising processor-executable routines that, when executed by a processor, facilitate a performance of operations. The operations include instructing a transducer of an unmanned aerial vehicle to transmit an ultrasonic signal. The operations further include changing an ultrasonic ranging state of the unmanned aerial vehicle based on an ultrasonic response to the ultrasonic signal. The ultrasonic response is received using a gain value corresponding to a noise floor estimate obtained for the unmanned aerial vehicle.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed implementations have other advantages and features that will be more readily apparent from the detailed description, the appended claims, and the accompanying figures. A brief introduction of the figures is below.

Figure 1A:
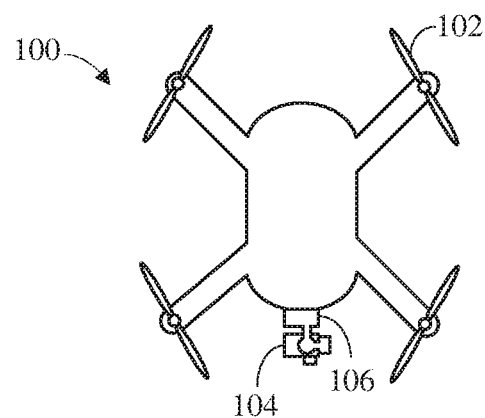
FIG. 1A shows an example of a UAV.

All figures disclosed herein are © Copyright 2017 GoPro Inc. All rights reserved.

DETAILED DESCRIPTION

A UAV may include ultrasonic functionality for determining a position of an object with respect to the UAV, such as based on ultrasonic waves sent from the UAV. The ultrasonic waves may be reflected by the object back to the UAV. The UAV may then process that reflection to determine such information as a distance between the object and the UAV. The UAV may include a sensor, such as a transducer, that sends the ultrasonic waves and receives reflections thereof. The transducer may be configured to send the ultrasonic waves using specified measurement levels that define the strength of the ultrasonic waves. For example, the specified measurement levels can include specified levels of gain values, burst count values, voltage values, or the like.

However, in some cases, the specified measurement levels used by the transducer may not be effective for sending ultrasonic waves. For example, a lower gain value may be effective for detecting strong ultrasonic waves at lower altitudes, but result in detecting weaker ultrasonic waves at higher altitudes. The transducer of the UAV may not receive reflections from objects below the UAV when a low gain value is used at a high enough altitude, such as because the ultrasonic waves sent from the UAV are too weak to be detected. The UAV would in such a case not be effective in determining the position of the object with respect to the UAV.

Further, the UAV may include one or more ultrasonic ranging states that are configured with different measurement levels, for example, based on an altitude of the UAV. However, the ultrasonic functionality of the UAV may not include functionality for dynamically changing the ultrasonic ranging state. For example, the UAV may require user input selecting a new ultrasonic ranging state to which to change. In another example, the UAV may not be able to change an ultrasonic ranging state while it is in operation.

Implementations of this disclosure address problems such as these using a state mechanism configured to change an ultrasonic ranging state of a UAV based on ultrasonic waves received at the UAV. The UAV can include a transducer and a signal processor. The transducer can be configured to transmit an ultrasonic signal and receive an ultrasonic response to the ultrasonic signal using a gain value. The signal processor can include a noise floor estimation mechanism and a state mechanism. The noise floor estimation mechanism can be configured to determine a noise floor estimate for the gain value, such as based on a binary search performed over a gain space available to the transducer. The state mechanism can be configured to set an ultrasonic ranging state used by the transducer based on the ultrasonic response to the ultrasonic signal.

For example, an ultrasonic ranging state of the UAV can be initially set to a long detect state. The transducer can transmit an ultrasonic signal and responsively receive an ultrasonic response to the ultrasonic signal using a gain value. The state mechanism can process the ultrasonic response, such as based on target values included therein, to determine whether to adjust the gain value used by the transducer, change the ultrasonic ranging state of the UAV (e.g., from the long detect state to a short detect state), or take other action. Using the state mechanism, the UAV can dynamically switch between configurations for detecting objects in short and long range distances.

The implementations of this disclosure will now be described in detail with reference to the drawings that are provided as illustrative examples to enable those skilled in the art to practice the technology. The figures and examples below are not meant to limit the scope of this disclosure to a single implementation, but other implementations are possible by way of interchange of or combination with some or all of the described or illustrated elements. Wherever convenient, the same reference numbers will be used throughout the drawings to refer to same or like parts.

FIG. 1A shows an example of a UAV 100. In this implementation, the UAV 100 has a quad-copter configuration, that is, the UAV 100 includes four rotors 102. Each rotor 102 is driven by a separate electric motor (not shown). However, the UAV 100 may be any form of an aerial vehicle. A battery pack (not shown) mounted on or in a body of the UAV 100 may supply electrical power to all four electric motors, flight electronics (not shown) associated with operation of UAV 100, and an imaging device 104 that provides still and video images by means of a communication link (not shown) to a ground-based user. The imaging device 104 may be coupled to a front of the UAV 100 using, for example, a movement mechanism 106.

In FIG. 1A, the movement mechanism 106 removably mounts the imaging device 104 to the UAV 100. The implementation of the movement mechanism 106 shown in this example is a three-axis gimbal that permits the imaging device 104 to be rotated about three independent axes. However, the movement mechanism 106 may include any type of translational and/or rotational elements that permit rotational and/or translational movement in one, two, or three dimensions of the imaging device 104 in respect to the UAV 100.

Figure 1B:
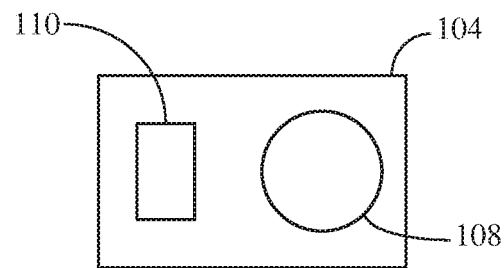
FIG. 1B shows an example of the imaging device associated with the UAV.

FIG. 1B shows an example of the imaging device 104 associated with the UAV 100. In FIG. 1B, the imaging device 104 is a GoPro Hero4® or Hero5® camera, however any type of imaging device 104 that can be coupled to the UAV 100, for example, through use of the movement mechanism 106, may be utilized. The imaging device 104 may include still image and video capture capabilities. FIG. 1B shows a lens 108 of the imaging device 104 and a display screen 110 associated with the imaging device 104. Means for coupling the imaging device 104 to the UAV 100 and/or the movement mechanism 106 are not shown.

Figure 1C:
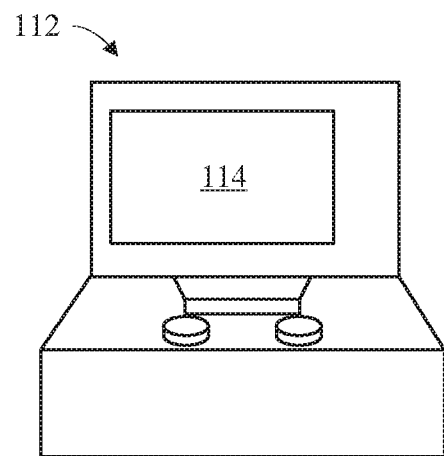
FIG. 1C shows an example of a remote controller and user interface for the UAV.

FIG. 1C shows an example of a remote controller 112 including a user interface 114 for operating the UAV 100. The remote controller 112 may include a communications interface (not shown) via which the remote controller 112 may receive and send commands related to operation of the UAV 100, the imaging device 104, and the movement mechanism 106. The commands can include movement commands, configuration commands, operational control commands, and imaging commands. In some implementations, the remote controller 112 may be a smartphone, a tablet computer, a phablet, a smart watch, a portable computer, and/or another device configured to receive user input and communicate information with the imaging device 104, the movement mechanism 106, and/or the UAV 100.

For example, flight direction, attitude, and altitude of the UAV 100 may all be controlled by controlling speeds of the motors that drive the respective rotors 102 of the UAV 100. During flight, a GPS receiver on the UAV 100 may provide navigational data to the remote controller 112 for use in determining flight paths and displaying current location through the user interface 114. A vision-based navigation system may also be implemented that tracks visually significant features through image data captured by the imaging device 104 to provide the necessary speed and position of the UAV 100 to the remote controller 112.

The communications interface may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the communications interface may be effectuated using a wired interface, e.g., HDMI, USB, digital video interface, display port interface (e.g., digital display interface developed by the Video Electronics Standards Association (VESA), Ethernet, Thunderbolt), and/or other interface.

The remote controller 112 may operate a software application (e.g., GoPro Studio®, GoPro App®, and/or other application) configured to perform a variety of operations related to camera configuration, positioning of the movement mechanism 106, control of video acquisition, and/or display of video captured by the imaging device 104 through the user interface 114. An application (e.g., GoPro App®) may enable a user to create short video clips and share video clips to a cloud service (e.g., Instagram®, Facebook®, YouTube®, Dropbox®); perform full remote control of functions of the imaging device 104; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 104 and/or displaying the captured information.

Figure 2:
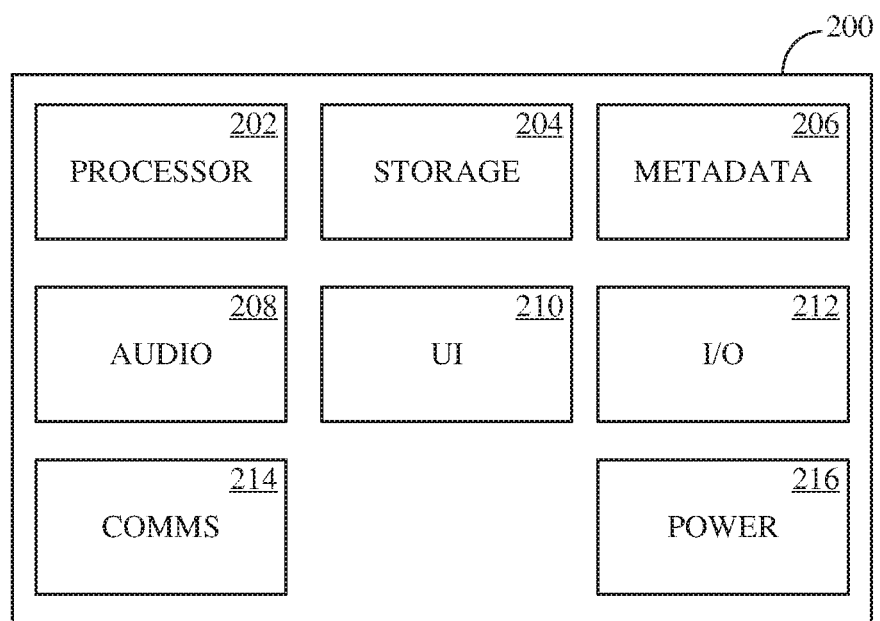
FIG. 2 is a block diagram illustrating components of a computing device.

FIG. 2 is a block diagram illustrating components of a computing device 200. The computing device 200 may be a single component of the UAV 100, the imaging device 104, the movement mechanism 106, or the remote controller 112. The computing device 200 may be multiple computing devices distributed in various ways between the UAV 100, the imaging device 104, the movement mechanism 106, or the remote controller 112. In the examples described, the computing device 200 may provide communication and control functions to the various components described in reference to FIGS. 1A, 1B, and 1C.

The computing device 200 may include a processor 202. The processor 202 may include a system on a chip (SoC), microcontroller, microprocessor, CPU, DSP, ASIC, GPU, or other processors that control the operation and functionality of the UAV 100, the imaging device 104, the movement mechanism 106, and/or the remote controller 112. The processor 202 may interface with mechanical, electrical, sensory, and power modules via driver interfaces and software abstraction layers. Additional processing and memory capacity may be used to support these processes. These components may be fully controlled by the processor 202. In some implementations, one or more components may be operable by one or more other control processes (e.g., a GPS receiver may include a processing apparatus configured to provide position and motion information to the processor 202 in accordance with a given schedule (e.g., values of latitude, longitude, and elevation at 10 Hz.))

The computing device 200 may also include electronic storage 204 in which configuration parameters, image data, and/or code for functional algorithms may be stored. The electronic storage 204 may include a system memory module that is configured to store executable computer instructions that, when executed by the processor 202, control various functions of the UAV 100, the imaging device 104, the movement mechanism 106, and/or the remote controller 112. The electronic storage 204 may also include storage memory configured to store content (e.g., metadata, frames, video, and audio) captured by the imaging device 104 or sensors associated with the UAV 100, the movement mechanism 106, and/or the remote controller 112.

The electronic storage 204 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 204 may be available for other hardware, firmware, or software needs of the UAV 100, the imaging device 104, the movement mechanism 106, and/or the remote controller 112. The memory and processing capacity may aid in management of processing configuration (e.g., loading, replacement) operations during a startup and/or other operations.

The computing device 200 may include or be in communication with metadata sources 206. The metadata sources 206 may include sensors associated with the UAV 100, the imaging device 104, and/or the movement mechanism 106. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor), and/or other sensors. The imaging device 104 may also provide metadata sources 206, e.g., image sensors, a battery monitor, storage parameters, and other information related to camera operation and capture of content. The metadata sources 206 may obtain information related to an environment of the UAV 100 and aspects in which the content is captured.

By way of a non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The the metadata sources 206 may be rigidly coupled to the UAV 100, the imaging device 104, the movement mechanism 106, and/or the remote controller 112 such that the processor 202 may be operable to synchronize various types of information received from various types of metadata sources 206.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 202 may perform operations on the received metadata to generate additional metadata information. For example, the processor 202 may integrate received acceleration information to determine a velocity profile of the imaging device 104 during a recording of a video.

The computing device 200 may include or be in communication with audio sources 208, such as one or more microphones, configured to provide audio information that may be associated with images acquired by the imaging device 104 or commands provided by the remote controller 112. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec.) In one or more implementations of spherical video and audio, the audio codec may include a 3-dimensional audio codec.

For example, an Ambisonics codec can produce full surround audio including a height dimension. Using a G-format Ambionics codec, a special decoder may not be required.

The computing device 200 may include or be in communication with a user interface (UI) 210. The UI 210 may include a display configured to provide information related to operation modes (e.g., camera modes, flight modes), connection status (e.g., connected, wireless, wired), power modes (e.g., standby, sensor, video), metadata sources 206 (e.g., heart rate, GPS, barometric), and/or other information associated with the UAV 100, the imaging device 104, the movement mechanism 106, and/or the remote controller 112. In some implementations, the UI 210 may include virtually any device capable of registering inputs from and communicating outputs to a user. These may include, without limitation, display, touch, gesture, proximity, light, sound receiving/emitting, wired/wireless, and/or other input/output devices. The UI 210 may include a display, one or more tactile elements (e.g., joysticks, switches, buttons, and/or virtual touch screen buttons), lights (e.g., LED, LCD, or the like), speakers, and/or other interface elements.

The UI 210 may be configured to enable the user to provide commands to the UAV 100, the imaging device 104, and/or the movement mechanism 106. For example, the user interface 114 shown in FIG. 1C is one example of the UI 210. User commands provided using the UI 210 may be encoded using a variety of approaches, including but not limited to duration of a button press (pulse width modulation), number of button presses (pulse code modulation), or a combination thereof. For example, two short button presses through the UI 210 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 200 may include an input/output (I/O) module 212. The I/O module 212 may be configured to synchronize the imaging device 104 with the remote controller 112, a second capture device, a smartphone, and/or a video server. The I/O module 212 may be configured to communicate information to and from various I/O components. The I/O module 212 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 212 may interface with LED lights, a display, a button, a microphone, speakers, and other I/O components. In one or more implementations, the I/O module 212 may be coupled to an energy source such as a battery or other DC electrical source.

The computing device 200 may include a communication module 214 coupled to the I/O module 212. The communication module 214 may include a component (e.g., a dongle) having an infrared sensor, a radio frequency transceiver and antenna, an ultrasonic transducer, and/or other communications interfaces used to send and receive wireless communication signals. In some implementations, the communication module 214 may include a local (e.g., Bluetooth, Wi-Fi, or the like) or broad range (e.g., 3G, Long Term Evolution (LTE) or the like) communications interface configured to enable communications between the UAV 100, the imaging device 104, the movement mechanism 106, and/or the remote controller 112.

The communication module 214 may employ communication technologies including one or more of Ethernet, 802.11, worldwide interoperability for microwave access (WiMAX), 3G, LTE, digital subscriber line (DSL), asynchronous transfer mode (ATM), InfiniBand, PCI Express Advanced Switching, and/or other communication technologies. By way of non-limiting example, the communication module 214 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 214 may be represented using formats including one or more of hypertext markup language (HTML), extensible markup language (XML), and/or other formats. One or more exchanges of information between the imaging device 104 and outside devices, such as the remote controller 112, may be encrypted using encryption technologies including one or more of secure sockets layer (SSL), transport layer security (TLS), virtual private networks (VPNs), Internet Protocol security (IPsec), and/or other encryption technologies.

The computing device 200 may include a power system 216 that may moderate a power supply based on the needs of the UAV 100, the imaging device 104, the movement mechanism 106, and/or the remote controller 112. For example, a battery, solar cell, inductive (contactless) power source, rectification, or other power supply housed within the UAV 100 may be controlled by the power system 216 to supply power for the imaging device 104 and/or the movement mechanism 106 when in a coupled state as shown in FIG. 1A.

Implementations of the computing device 200 may include additional, fewer, or different components than shown in FIG. 2. In some implementations, the computing device 200 may include optics. For example, the optics may include a lens, such as the lens 108 shown in FIG. 1B. The lens may, for example, include a standard lens, macro lens, fisheye lens, zoom lens, special-purpose lens, telephoto lens, prime lens, achromatic lens, apochromatic lens, process lens, wide-angle lens, ultra-wide-angle lens, infrared lens, ultraviolet lens, perspective control lens, or the like.

In some implementations, the computing device 200 may include an image sensor. For example, the image sensor may be a charge-coupled device (CCD) sensor, active pixel sensor (APS), complementary metal-oxide semiconductor (CMOS) sensor, N-type metal-oxide-semiconductor (NMOS) sensor, or the like, or a combination thereof. The image sensor may be configured to capture light waves gathered by optics of the computing device 200 and generate image data based on control signals from a sensor controller. For example, the optics may include focus controller functionality configured to control the operation and configuration of a lens, such as for receiving light from an object and transmitting the received light to the image sensor. The image sensor may use the received light to generate an output signal conveying visual information regarding an object. For example, the visual information may include one or more of an image, a video, and other visual information.

Figure 3:
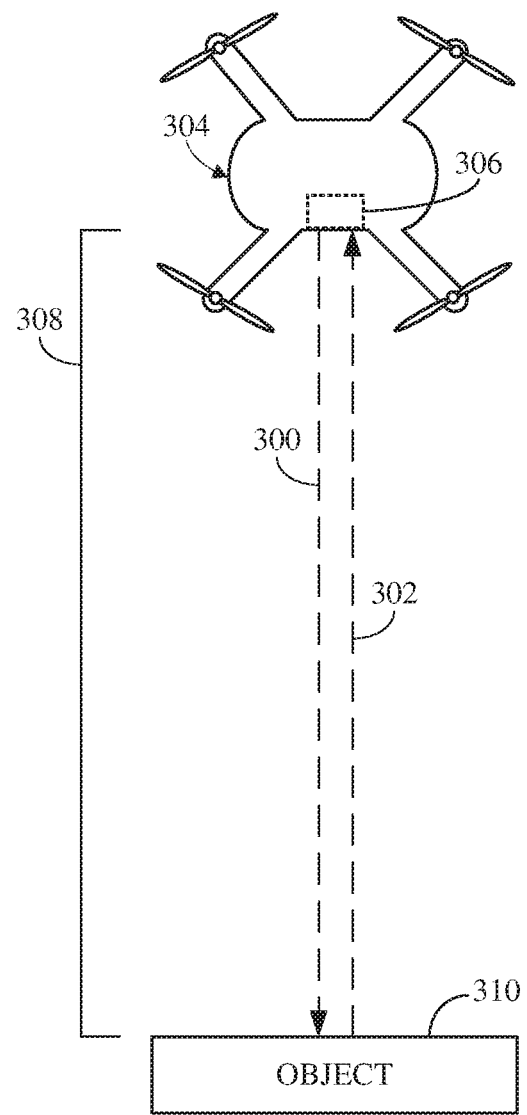
FIG. 3 shows an example of an ultrasonic signal transmitted from and an ultrasonic response received at a UAV.

FIG. 3 shows an example of an ultrasonic signal 300 transmitted from and an ultrasonic response 302 received at a UAV 304. The UAV 304 may, for example, be the UAV 100 shown in FIG. 1A. The UAV 304 includes a transducer 306 used to transmit the ultrasonic signal 300 and receive the ultrasonic response 302. The transducer 306 is an element configured to transmit and/or receive ultrasonic waves. For example, the transducer 306 can be a piezo-electric element, such as a crystal. As will be described below, the transducer 306 can be or otherwise include one or more transducers. For example, the transducer 306 can include a first transducer for transmitting the ultrasonic signal 300 and a second transducer for receiving the ultrasonic response 302.

The ultrasonic signal 300 includes ultrasonic waves used to determine a distance 308 between the UAV 304 and an object 310. The object 310 is an object over which the UAV can be operated. For example, the object 310 can be an outdoor element (e.g., a portion of ground, earth, rock, or the like; a topographical phenomenon, such as a hill or bluff; a building or other structure; or the like) or an indoor element (e.g., a portion of floor, stairs, or the like). The transducer 306 transmits the ultrasonic waves of the ultrasonic signal 300 to the object 310. In response to the ultrasonic signal 300, the transducer 306 receives the ultrasonic response 302, which includes ultrasonic waves reflected from the object 310. In particular, the ultrasonic waves of the ultrasonic response 302 may include one or more target values indicative of a position of the object 310 with respect to the UAV 304, such as based on the distance 308. A target value may be a binary indication that an object is detected. For example, the inclusion of a target value in the ultrasonic response 302 indicates that the object 310 is within a field-of-view range of the transducer 306. However, when the ultrasonic response 302 does not include a target value, there may be an indication that the object 310 is not within the field-of-view range of the transducer 306.

The transducer 306 transmits the ultrasonic signal 300 upon being driven, such as by drive circuitry of the UAV 304. Drive circuitry can include hardware and/or software components configured to excite the transducer 306, such as by communicating some amount of voltage to the transducer 306. After the communication of the voltage to the transducer 306 stops, the transducer 306 experiences a decaying, mechanical vibrational effect, which is referred to as ringing. The period of time between when the ringing begins and stops is referred to as a ring-down window. A ring-down window may be associated with the transducer 306, such as based on the composition of the transducer 306, the manufacturing process for the transducer 306, other factors, or the like, or a combination thereof. For example, the ring-down window may be characteristic of the transducer 306, such as based on the way the transducer 306 was manufactured. In another example, the ring-down window may be artificially associated with the transducer 306. For example, an average ring-down window may be determined based on a sample of transducers, and an artificial ring-down window may be associated with the transducer 306 based on the average value and some degree of variance.

The ultrasonic signal 300 is transmitted from and the ultrasonic response 302 is received by the transducer 306 using levels of outputs of the UAV 304. For example, the UAV 304 may include hardware and/or software components for measuring or otherwise adjusting one or more of a gain value, wave count, output power, frequency, or the like. The hardware components of the UAV 304 may include a gain amplifier (e.g., an analog front end (AFE)), an analog-to-digital converter (ADC), a signal processor, or the like, or a combination thereof. The signal processor may include software components, for example, including a noise floor estimation mechanism configured to determine a noise floor estimate for gain values for use by the transducer 306. The noise floor estimate can be used, for example, to verify a gain value used by the transducer 306 to receive ultrasonic responses, such as the ultrasonic response 302. One or more of the components of the UAV 304 may be included in an integrated circuit (IC).

The UAV 304 may use multiple ultrasonic ranging states for detecting the distance 308. Some ultrasonic ranging states may be more effective for detecting the distance 308 than others in certain situations. A configuration of an ultrasonic ranging state can cause the UAV 304 to use a defined value or range of values for power, gain, frequency, or other elements used to transmit the ultrasonic signal 300. The UAV 304 can include a state mechanism configured to change the ultrasonic ranging state of the UAV 304.

For example, the multiple ultrasonic ranging states available to the UAV 304 can include a long detect state and a short detect state. The long detect state may be more effective than the short detect state when the UAV is operated above a height threshold (e.g., when the distance 308 is more than four meters). The short detect state may thus be more effective than the long detect state when the UAV is operated at or below the height threshold. The state mechanism of the UAV 304 can change the ultrasonic ranging state of the UAV 304 from the long detect state to the short detect state to improve the ability of the UAV 304 to detect the distance 308.

The configuration of the long detect state may include using high ranges of levels of output power, burst count, gain values, or the like to achieve the strongest possible signal-to-noise ratio (SNR) while avoiding saturation. For example, the ranges used by the long detect state may be high as compared to the ranges used by the short detect state, as described below. This enables detection of target values within the ultrasonic response 302 when the distance 308 is above the height threshold. Certain information collected during the long detect state may be associated with a target value, such as a minimum time, maximum time, time of peak energy, SNR, and time since the noise floor estimate was determined. For example, this information can be used (e.g., by the IC) to approximate the target values as random variables with Gaussian distribution such that the mean target value in the ultrasonic response 302 is calculated as ((maximum time−minimum time)/2) and the variance is proportional to (time of peak energy*SNR).

However, using maximum levels of output power and gain may cause a high ring-down of the transducer 306, resulting in a saturation of an ADC of the UAV 304. The transducer 306 may not be effective in detecting short-range target values within the ultrasonic response 302 when the ADC is saturated. For example, saturation of the ADC may result in the UAV 304 not being able to accurately determine whether the ultrasonic response 302 includes target values or mere sympathetic ringing values (e.g., artefacts remaining from a previous ultrasonic response).

As such, the configuration of the short detect state may include using low ranges of levels of output powers, burst counts, gain values, or the like to more effectively identify target values within the ultrasonic response 302. For example, the ranges used by the short detect state may be low as compared to the ranges used by the long detect state. The lower output power and gain levels may also result in a higher refresh rate for the transducer 306 while in the short detect state (e.g., as compared to the refresh rate of the transducer 306 while in the long detect state). However, those lower output power and gain levels may not be effective for detecting the object 310 when the distance 308 exceeds the height threshold. For example, the ultrasonic signal 300 and the ultrasonic response 302 are weaker when those levels are lower, which may cause more distant objects to not be accurately detected.

There may be advantages to using a multiple ultrasonic ranging state system beyond accuracy in object detection. For example, the transducer 306 has a refresh rate indicative of a period of time between when the ultrasonic signal 300 is transmitted and when a subsequent ultrasonic signal is able to be transmitted (e.g., after the ultrasonic response 302 is received). In the long detect state, the refresh rate for the transducer 306 may, for example, be 65 milliseconds. However, in a short detect state, the refresh rate for the transducer 306 may be higher, such as because the distance 308 is smaller. Limiting the range for transmitting the ultrasonic signal 300 may thus result in improvements to the refresh rate used by the transducer 306.

Figure 4:
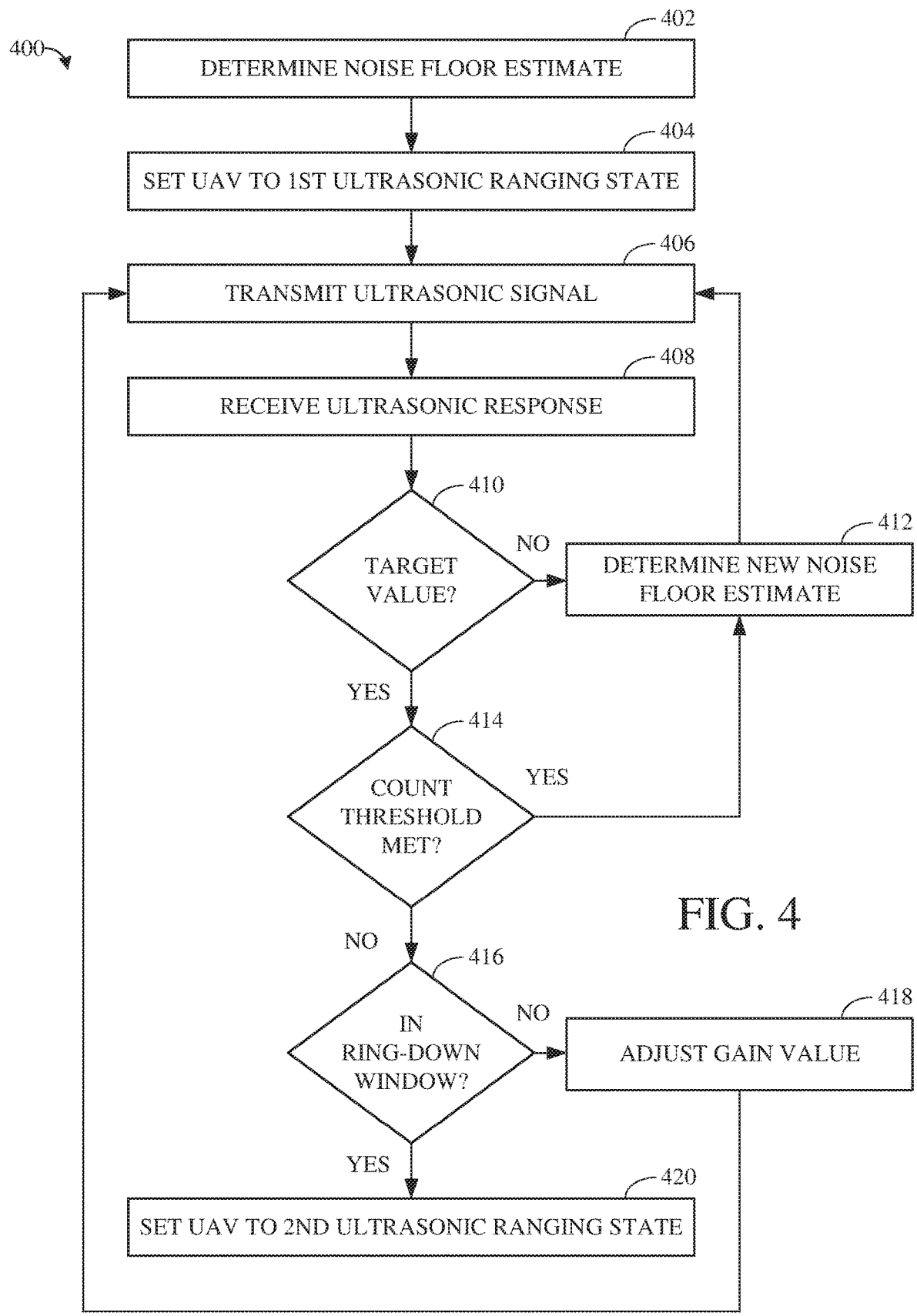
FIG. 4 is a flowchart showing an example of a technique for ultrasonic ranging state management.

FIG. 4 is a flowchart showing an example of a technique 400 for ultrasonic ranging state management. The technique 400 can be performed, for example, using hardware and/or software components of a UAV, such as the UAV 304 shown in FIG. 3. Although the technique 400 is described with respect to a series of operations, the operations comprising the technique 400 may be performed in orders other than those described herein. In some implementations, the technique 400 may include additional, fewer, or different operations than described herein.

At 402, a noise floor estimate is determined. Determining the noise floor estimate can include determining a noise floor estimate for gain values for a transducer of a UAV based on a binary search performed over a gain space. The gain space may be delimited by minimum and maximum gain values for the UAV. For example, the gain space can include a range of gain values usable by the transducer (e.g., gain values of 0 to 116, which may correspond to actual gains of 32.5 to 90 decibels).

The UAV can include a noise floor estimation mechanism for determining the noise floor estimate. The noise floor estimation mechanism listens to and measures a background level of noise within an environment including the UAV over a period of time (e.g., 65 milliseconds). Noise values measured over that period of time can be used in the binary search to determine the noise floor estimate, which indicates the sum of the noise within the environment in which the UAV operates.

Performing the binary search can include determining a value of the gain space at which an ADC signal value meets a threshold. For example, the threshold can be a gain value at which the ADC reaches fifty percent use. The gain value used as input to the binary search can be a midpoint value of the minimum and maximum values of the gain space. Alternatively, the gain value used as input can be a non-midpoint value of the gain space, such as a value determined using a heuristic for performing the binary search.

However, searching over a gain space to determine the noise floor estimate may be complicated by using arbitrary gain values as input to the binary search. For example, an ADC measurement taken based on an arbitrary gain value may cause the ADC to be saturated. In another example, the noise could be at or near zero, in which case there may not be enough ADC resolution to determine the noise floor estimate (e.g., because there are not enough bits to read or quantify the noise). This saturation or insufficient ADC resolution may prevent an accurate noise measurement, resulting in an inaccurate noise floor estimate. The use of a value provided by the gain amplifier can prevent this saturation or insufficient ADC resolution.

After the initial input is set, the ADC can be used to take N (e.g., four or eight) noise measurement samples. The number of noise measurement samples taken may be larger in environments where there is a greater potential of noise variance, for example, outdoor environments. The noise measurement samples are measured according to the highest peak values thereof. In some cases, the maximum number of noise measurement samples that can be taken at a given time may be based on hardware limitations. For example, where the UAV includes an eight-bit ADC, up to eight noise measurement samples may be taken.

In the event the noise measurement samples indicate that the noise is at or near zero, another search is performed using the portion of the gain space including values greater than the initial input value. In the event the noise measurement samples indicate that the noise is saturated, another search is performed using the portion of the gain space including values lower than the initial input value. The binary search can be continued until the threshold is met, for example, when the binary search returns a value of the gain space at which the ADC is at fifty percent.

Alternatively, an offset can be determined for the value of the gain space based on a difference between the value of the gain space and an ADC signal value. In the event the noise measurement samples taken during a step of the binary search indicate that the noise falls within a defined range, the binary search may be discontinued. The noise value indicated by the noise measurement samples is added to the offset to determine the noise floor estimate. The window can be delimited by values at which the ADC saturates or lacks sufficient resolution. For example, the window can be defined to include values at which the ADC is at thirty to seventy percent. The offset can be calculated as a decibel value equal to $\log_2$ (indicated noise value/noise value when ADC is at 50%)*6.

The offset can indicate the value to be added to the indicated noise floor to bring it up or down to the value at which the ADC is at fifty percent. The total time used to determine the noise floor estimate can be reduced by calculating an offset, for example, by obviating remaining portions of the gain space to be binary searched.

At 404, the UAV is set to a first ultrasonic ranging state. Setting the UAV to a first ultrasonic ranging state can include setting an ultrasonic ranging state of the UAV to a long detect state. As described above, the long detect state can have a configuration indicating to use a highest output power level and a highest gain value according to the determined noise floor estimate. The long detect state can be the initial ultrasonic ranging state into which the UAV enters.

At 406, an ultrasonic signal is transmitted using a transducer of the UAV. For example, the transducer of the UAV can be instructed, such as by drive circuitry of the UAV, to transmit an ultrasonic signal. The instructions for transmitting the ultrasonic signal can be communicated from a signal processor of the UAV, such as using drive circuitry of the UAV.

At 408, an ultrasonic response is received. Receiving the ultrasonic response can include receiving, by the transducer, an ultrasonic response to the ultrasonic signal transmitted from the transducer of the UAV. The transducer receives the ultrasonic response using a gain value that corresponds to the noise floor estimate obtained for the UAV. The transducer may receive the ultrasonic response responsive to the ultrasonic signal being reflected, such as by an object below or otherwise near the UAV. Alternatively, the transducer may receive the ultrasonic response based on instructions received from receive circuitry of the UAV (e.g., which controls the ability of the transducer to receive ultrasonic responses to ultrasonic signals). After receiving the ultrasonic response, further processing of the ultrasonic response may in some cases be delayed, such as where secondary reflections are detected.

At 410, a determination is made as to whether the ultrasonic response to the ultrasonic signal includes at least one target value. The ultrasonic response may include one or more target values indicative of reflections from objects below or otherwise near the UAV. However, in some cases, the ultrasonic response may not include any target values. For example, if the gain value used by the transducer to receive the ultrasonic response to the ultrasonic signal is too low, target values in the ultrasonic response may not be detected. In another example, the ultrasonic response may be too weak to be detected based on the low gain value.

At 412, responsive to a determination that the ultrasonic response does not include at least one target value, a new noise floor estimate might be determined. A gain hunt can be performed to identify a new gain value to use to receive ultrasonic responses. A new noise floor estimate may then be determined, such as to validate that new gain value. Performing a gain hunt can include processing ultrasonic waves (e.g., raw echo data) over a scoped plot, for example, to measure the magnitudes of the ultrasonic waves. For example, the ultrasonic waves can be sample measurements collected by the transducer. If the magnitudes of the ultrasonic waves are too low, the gain hunt may not be able to return a new gain value. In such a case, the gain value used by the transducer to collect the sample measurements can be doubled and new sample measurements can be collected.

The first ultrasonic ranging state may be associated with a range of gain values. For example, the range of gain values can include gain values that may be used to receive an ultrasonic response to an ultrasonic signal during the first ultrasonic ranging state. Performing the gain hunt at 412 may include determining a new gain value to use without changing from the first ultrasonic ranging state. The new gain value is a gain value included in the range of gain values associated with the first ultrasonic ranging state.

The magnitudes of the sample measurements may be used as input to a Gaussian model, which processes those magnitudes to determine a new gain value usable to receive target values. In some cases, a second noise floor estimate for the gain values of the UAV may then be determined using the new gain value, for example, in the manner described above with respect to 402. The second noise floor estimate can be used to verify the new gain value identified based on the gain hunt (e.g., the new gain value to be used by the transducer to receive subsequent ultrasonic responses).

Determining a new noise floor estimate may include determining to continue using a previously-determined noise floor estimate rather than using a different noise floor estimate. For example, noise measurements taken after the gain hunt may indicate that the noise value of the environment in which the UAV operates is the same as or similar to the noise value identified when previously determining the noise floor estimate. In such a case, the previously determined noise floor estimate would continue to be used and a different noise floor estimate would not be determined. For example, the new gain value identified by performing the gain hunt may first be checked using a previously-determined noise floor estimate. If that noise floor estimate is usable to verify the new gain value, a new noise floor estimate may not be determined.

At 414, responsive to determining that the ultrasonic response to the ultrasonic signal includes at least one target value, a determination is made as to whether a target value included in the ultrasonic response causes a count of target values to exceed a count threshold. For example, the determination can be as to whether the count threshold is exceeded by the target value included in the ultrasonic response.

The count threshold can refer to a number of times that a maximum magnitude associated with a target value has been met by target values included in ultrasonic responses. For example, the maximum magnitude can be defined to represent a value of an ultrasonic response including a target value at which the ADC of the UAV begins saturating. The maximum magnitude can be set based on the particular hardware limitations of the ADC, according to out-of-the-box settings of the UAV, or the like. The count threshold can be zero or more counts of the maximum magnitude being met. For example, where the count threshold is zero, the count threshold is exceeded when one target value meets or exceeds the maximum magnitude. In another example, where the count threshold is seven, the count threshold is exceed when eight target values meet or exceed the maximum magnitude. An IC of the UAV may include functionality for detecting when a maximum magnitude has been met. For example, the IC may perform fine-grain, time-based discrimination of threshold crossings so as to indicate when a threshold (e.g., the maximum magnitude) has been crossed.

A determination that the count threshold is exceeded may indicate that the noise floor has increased since the noise floor estimate was determined. For example, there may have been an increase in noise within the environment in which the UAV operates. Alternatively, it may indicate that the gain value used by the transducer to receive ultrasonic responses is too high. For example, an unexpectedly high number of target values may be included in an ultrasonic response when the corresponding ultrasonic signal is transmitted with a high gain value.

Responsive to determining that the target value causes the count of target values to exceed the count threshold, the technique 400 continues to 412, where a second noise floor estimate for the gain values of the UAV is determined. A gain hunt is performed to identify a new gain value to use to receive ultrasonic responses by the transducer (e.g., a new value to which to adjust the current gain value). The second noise floor estimate may, in some cases, be determined to verify that the new gain value corresponds to the second noise floor estimate. The second noise floor estimate may be lower than the noise floor estimate that was previously determined and used to receive the ultrasonic response at 408. For example, determining the second noise floor estimate can include decreasing the noise floor estimate determined at 402. After the second noise floor estimate is determined at 412, the new gain value identified by performing a gain hunt is verified using the second noise floor estimate.

At 416, responsive to determining that a target value included in the ultrasonic response does not cause the count of target values to exceed the count threshold, a determination is made as to whether a target value included in the ultrasonic response is inside of a ring-down window associated with the transducer. The target value is inside of the ring-down window if it is received while the transducer is ringing. For example, a target value may be inside of the ring-down window if the object from which the target value reflects is relatively close to the UAV.

At 418, responsive to determining that a target value is not inside of the ring-down window, the gain value used to receive the ultrasonic response is adjusted. Adjusting the gain value can include adjusting the gain value from a first value to a second value according to the noise floor estimate. The gain value can be adjusted using an AFE of the UAV, for example, based on a highest magnitude target value not inside of the ring-down window. That highest magnitude target value is used as input for a Gaussian model, which returns a more effective gain value that is within the minimum and maximum gain value peaks for the ADC of the UAV. Alternatively, the input for the Gaussian model can be an average of the highest magnitude target values of the N (e.g., 4) most recent ultrasonic responses. For example, the average can be taken to prevent inconsistent measurements (e.g., caused by variations in orientation or other motion of the UAV) from being used to adjust the gain value.

The gain value can be adjusted in a similar manner as described above with respect to performing a gain hunt. The decibel value of the amount for the adjustment can be calculated as $\log_2$ (actual peak magnitude/target peak magnitude)*6. For example, the target peak magnitude can be a value at which the ADC is at eighty percent.

Adjusting the gain value may first include determining whether the peak magnitudes of the target values included in the ultrasonic response are inside of an acceptable value range of the ADC. If those peak magnitudes are too high, the target values may cause the ADC to saturate. If those peak magnitudes are too low, they may not be detectable. In the event a determination is made that the those peak magnitudes are inside of the acceptable value range, no adjustment is made to the gain value at 418, and another ultrasonic signal can be transmitted using the same gain value as previously used. Otherwise, an adjustment is made to the gain value.

As previously described, the first ultrasonic ranging state may be associated with a range of gain values. Adjusting the gain value at 418 may include changing the gain value from a first value in that range to a second value in that range. The adjusting at 418 may thus be performed without changing the ultrasonic ranging state of the UAV.

At 420, responsive to determining that a target value is inside of the ring-down window, the UAV is set to a second ultrasonic ranging state. Setting the UAV to a second ultrasonic ranging state can include setting the ultrasonic ranging state of the UAV to a short detect state. As such, the ultrasonic ranging state of the UAV can be changed based on the ultrasonic response to the ultrasonic signal (e.g., based on a target value included in the ultrasonic response). Changing the ultrasonic ranging state can include setting a new gain value to use to receive ultrasonic responses. For example, the second ultrasonic ranging state may be associated with a range of gain values that is different from the range of gain values associated with the first ultrasonic ranging state. The new gain value set responsive to changing the ultrasonic ranging state of the UAV may be a gain value included in the range of gain values associated with the second ultrasonic ranging state.

The technique 400 may repeat while the UAV remains in operation. For example, after setting the UAV to the second ultrasonic ranging state, the technique 400 can return to 406 where another ultrasonic signal is transmitted. The performance of the technique 400 may begin upon a takeoff of the UAV or at a time proximate thereto. The performance of the technique 400 may cease upon a landing of the UAV, a powering off of the UAV, or a time proximate to the landing or powering off.

However, aspects of the technique 400 may change after the UAV has been set to the second ultrasonic ranging state. For example, when the UAV is set to the second ultrasonic ranging state, a determination at 416 that a target value is inside of a ring-down window may lead to a gain value adjustment at 418, while a determination at 416 that a target value is not inside of the ring-down window may lead to resetting the UAV back to the first ultrasonic ranging state. For example, determining that a target value is not inside of the ring-down window while the UAV is in the short detect state may indicate that the refresh rate for the transducer is not as high as it should be. Further, the adjusting of gain values while the UAV is in the second ultrasonic ranging state can include adjusting the gain value from a first gain value included in the range of gain values associated with the second ultrasonic ranging state to a second gain value included in that range of gain values.

In some implementations, the determination as to the ultrasonic response to the ultrasonic signal includes a target value is made after multiple ultrasonic signals are transmitted and ultrasonic responses received. For example, the determinations made at 410, 414, and/or 416 can be based on multiple ultrasonic responses. Target values included in the multiple ultrasonic responses can be averaged, and those average values can be input to the determinations at 410, 414, and/or 416. For example, the determination at 410 can include determining whether no target values were included in a threshold number of ultrasonic responses. This may be useful where the UAV experiences variations in position, orientation, speed, or the like, or a combination thereof.

For example, various forces acting on the UAV may cause a single ultrasonic response to not be useful for detecting an object, such as because a target value included in that ultrasonic response does not accurately represent the distance between the UAV and that object. Using an average of multiple values can increase the likelihood that the target values included in the ultrasonic responses are accurate. In some implementations, the number of ultrasonic responses used for the averaging may be based on the hardware capabilities of the UAV. For example, the number of ultrasonic responses may correspond to the bit size of the ADC.

In some implementations, the technique 400 can include varying voltage levels for the transducer. For example, a voltage level used by the transducer (e.g., by drive circuitry or receive circuitry thereof) to transmit ultrasonic signals or receive ultrasonic responses can be increased or decreased. Changing the voltage level may cause a corresponding change in output power for the transducer, such that a decreased voltage level may result in a weaker ultrasonic signal being transmitted or a weaker detection of an ultrasonic response, whereas an increased voltage level may result in a stronger ultrasonic signal being transmitted or a stronger detection of an ultrasonic response. In some implementations, the technique 400 can include varying a burst count for the transducer. For example, varying the burst count may include adjusting a count of waves included in the ultrasonic signal. This may result in a weaker or stronger detection of an ultrasonic response to the ultrasonic signal (e.g., based on whether the count of waves is decreased or increased, respectively).

In some implementations, the UAV is set to the second ultrasonic ranging state at 420 responsive to determining that a target value included in the ultrasonic response is inside the ring-down window, decreasing the gain value used to receive ultrasonic responses, transmitting another ultrasonic signal, receiving an ultrasonic response to that other ultrasonic signal using the decreased gain value, and determining whether an ultrasonic response that that other ultrasonic signal includes a target value inside the ring-down window. For example, the determination at 416 may be whether a target value might be inside the ring-down window, rather than a dispositive determination that a target value is inside it. Decreasing the gain value and transmitting another ultrasonic signal can be done to verify whether a target value in actually inside the ring-down window before changing the ultrasonic ranging state of the UAV.

In some implementations, the determinations at 410 and 414 can be combined into a single operation. For example, the operation can include determining whether the ultrasonic response does not include at least one target value or includes a target value causing a count of target values to exceed a count threshold. If either criterion is met, the technique 400 proceeds to determining a new noise floor estimate at 412. If neither criterion is met, the technique 400 proceeds to the determination at 416.

In some implementations, the technique 400 can include determining a new noise floor estimate for the gain values of the UAV based on a staleness period of the current noise floor estimate expiring. For example, determining a noise floor estimate (e.g., at 402, 412, or the like) can include associating a staleness period with that noise floor estimate. The staleness period can indicate a defined period of time during which the noise floor estimate can be presumed accurate, subject, for example, to the determinations made at 410, 414, and/or 416. For example, the technique 400 may include proceeding to 412 upon the expiration of the staleness period of a current noise floor estimate.

In some implementations, determining the new noise floor estimate at 412 can include changing the ultrasonic ranging state of the UAV. For example, the determining at 412 can include determining whether the ultrasonic ranging state of the UAV is a long detect state. If it is, the ultrasonic ranging state of the UAV is not changed and the technique 400 returns to 406 where another ultrasonic signal is transmitted (e.g., according to the new noise floor estimate, gain value, or the like determined at 412).

However, if it is determined that the ultrasonic ranging state of the UAV is a short detect state, the ultrasonic ranging state of the UAV is changed to a long detect state before the technique 400 returns to 406. Upon returning to 406, another ultrasonic signal is transmitted while the UAV is in the long detect state. In some implementations, performing a gain hunt can include automatically setting the ultrasonic ranging state of the UAV to a long detect state.

In some implementations, the changing of the ultrasonic ranging state can be selectively triggered. For example, the ultrasonic ranging state can be selectively set to the short detect state when the UAV is preparing for landing. The selective setting can be based on input received. For example, a signal processor of the UAV can determine that the UAV is preparing for landing, such as based on measuring a descent of the UAV, detecting the landing motion using a camera of the UAV, receiving input from a user of the UAV, or the like, or a combination thereof.

Figure 5:
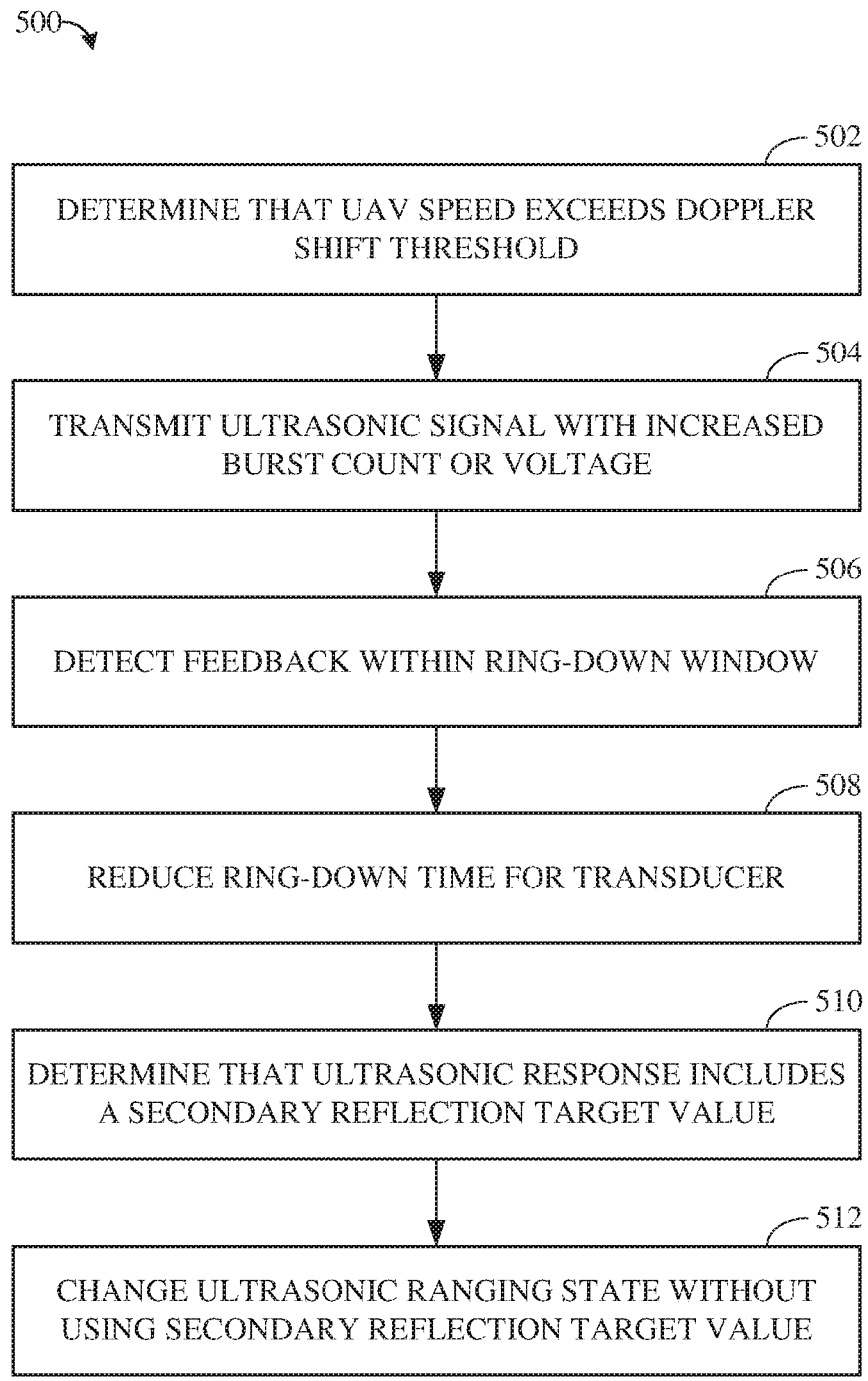
FIG. 5 is a flowchart showing another example of a technique for ultrasonic ranging state management.

FIG. 5 is a flowchart showing another example of a technique 500 for ultrasonic ranging state management. The technique 500 can be performed, for example, using hardware and/or software components of a UAV, such as the UAV 304 shown in FIG. 3. Although the technique 500 is described by a series of operations, the operations comprising the technique 500 may be performed in orders other than those described herein. In some implementations, the technique 500 may include additional, fewer, or different operations than described herein.

The operations of the technique 500 may be performed separately from one another or otherwise not be dependent upon one another. For example, the operations at 502 and 504 include increasing one of a burst count or a voltage used by a transducer of a UAV to transmit an ultrasonic signal based on a speed of the UAV exceeding a Doppler shift threshold. In another example, the operations at 506 and 508 include detecting feedback and reducing a ring-down time for the transducer. In yet another example, the operations at 510 and 512 include determining that an ultrasonic response to the ultrasonic signal includes a secondary reflection target value and determining to change the ultrasonic ranging state of the unmanned aerial vehicle without considering the secondary reflection target value. As such, implementations of the technique 500 may include performing all of the operations at 502 through 512, only the operations at 502 and 504, only the operations at 506 and 508, only the operations at 510 and 512, or other combinations thereof.

At 502, a determination is made that the speed of the UAV exceeds a Doppler shift threshold. For example, a flight controller component of the UAV can include functionality for determining a motion and directivity of the UAV, such as with respect to an object from which target values are received. In the event the flight controller anticipates a significant motion with respect to that object to cause a change in frequency of the ultrasonic response, a compensation can be made to one or burst count or voltage used to drive the transducer of the UAV. For example, a significant motion can be anticipated with the speed of the UAV exceeds the Doppler shift threshold, which, for example, can represent a maximum speed before which the UAV may change frequency.

At 504, responsive to the determination that the speed of the UAV exceeds the Doppler shift threshold, a compensation to burst count or voltage can be applied to cause the transducer to transmit a next ultrasonic signal with an increased burst count or voltage. Determining that the speed of the UAV exceeds the Doppler shift threshold may indicate that some number of following drive cycles will be subject to decreased performance as a result of a Doppler shift. For example, the Doppler shift may cause resonance to the transducer that impedes the ability of the transducer to effectively receive ultrasonic responses. That is, the change in frequency to the ultrasonic response due to the Doppler shift may vary from the resonant frequency of the transducer in such a way so as to cause a reduction in receiving voltage and, therefore, performance. Increasing the burst count or voltage can result in a higher overall output power of ultrasonic signals, thus overcoming the resonance introduced by the Doppler shift.

At 506, feedback (e.g., of an ADC of the UAV) is detected. The feedback may, for example, include sympathetic ringing values, such as artefacts remaining from a previous ultrasonic response. Detecting the feedback may include comparing the detected feedback to a saturation threshold. The saturation threshold can be the value of the ADC at which saturation begins. As such, the detecting can include determining that feedback causes saturation of the ADC. The feedback can be based on an ultrasonic response to an ultrasonic signal transmitted from the transducer of the UAV. For example, the feedback can be or otherwise include a target value causing saturation of the ADC. However, detecting the feedback may not necessarily include determining that feedback exceeds the saturation threshold. For example, feedback may be expected from transmitting an ultrasonic signal, and so a threshold comparison may not be necessary.

At 508, responsive to detecting the feedback, the ring-down time for the transducer can be reduced. Reducing the ring-down time for the transducer can include using a counter-drive mechanism of the UAV to act against the transducer. For example, the counter-drive mechanism may implement an open-loop counter-drive or a closed-loop counter-drive. In an open-loop counter-drive, the transducer is driven for N cycles to excite the transducer. Once the N cycles are completed, the drive signal is inverted one hundred eighty degrees out of phase and is used to drive the transducer at the same frequency for M cycles in a direction opposite that of the driving during the N cycles. Driving in that opposite direction reduces the ring-down time of the transducer, similar to the way that pushing a pendulum in a direction opposite to its movement may slow it down. The value of N may be configurable (e.g., based on software used to operate the UAV), and the value of M may be a lower number than the value of N, such as in order to accommodate the reduction in the ring-down time.

In a closed-loop counter-drive, the transducer is driven for N cycles to excite the transducer. Once the N cycles are completed, and as the transducer is ringing, the voltage and waveform across the transducer are observed and then fed back to the transducer as input to drive the transducer using an inverted drive signal (e.g., inverted one hundred eighty degrees out of phase from the direction of driving during the N cycles). The effect may be similar a crystal oscillator where the goal is to decrease the resonance of the crystal. The value of N may be configurable (e.g., based on software used to operate the UAV). The use of a counter-drive mechanism may result in improved detection of target values. That is, the counter-drive mechanism can reduce or eliminate sympathetic ringing values, which could otherwise affect the accuracy of target value detection. Alternativelym, the use of a counter-drive mechanism may result in a much quicker reduction in ringing, such as compared to the typical gradual decay in systems not including counter-drive functionality. The quicker reduction in ringing may, for example, result in a better refresh rate for the transducer.

At 510, a determination is made as to whether an ultrasonic response received using the transducer includes a secondary reflection target value. A secondary reflection may be caused by a target value reflecting off of the UAV and returning to a detected object before being received by the transducer or otherwise processed as part of an ultrasonic response. For example, an ultrasonic signal transmitted using the transducer may be reflected by an object on the ground below the UAV, and the reflection may include a target value. The underside of the UAV may unintentionally reflect the reflection back to the object (or at a location proximate thereto). Alternatively, an object above the UAV (e.g., a ceiling in an indoor environment) may reflect the reflection back to the object. A secondary reflection is then created and sent to the UAV. However, the secondary reflection may not be useful to the UAV for detecting the object or other purposes. For example, the power with which the secondary reflection is sent may be less than that with which the actual target value (e.g., of the initial reflection) is sent. Using the lesser power may cause the UAV to, for example, incorrectly adjust a gain value or change between ultrasonic ranging states.

Determining that an ultrasonic response includes a secondary reflection target value (e.g., a target value resulting from a secondary reflection) can include observing patterns in reflections from an object. The patterns may, for example, statistically show multiple phantom objects. For example, a secondary reflection target value may be an integer multiple of the distance between the object and the UAV. As such, when a reflection is made back to the object (e.g., from the UAV), the transducer may ultimately receive a multiple of the strongest return; otherwise, however, the transducer may ultimately receive a multiple of some other value. An ultrasonic response can thus be determined to include a secondary reflection target value if a target value of the ultrasonic response represents an integer multiple of the distance between the object and the UAV.

At 512, responsive to determining that the ultrasonic response includes a secondary reflection target value, the ultrasonic ranging state of the UAV is changed without using the secondary reflection target value. For example, the secondary reflection target value can be discarded or otherwise not used during a determination that may result in a change of the ultrasonic ranging state of the UAV. For example, one or more of the determinations at 410, 414, and/or 416 shown in FIG. 4 may be performed without using the secondary reflection target value.

Figure 6:
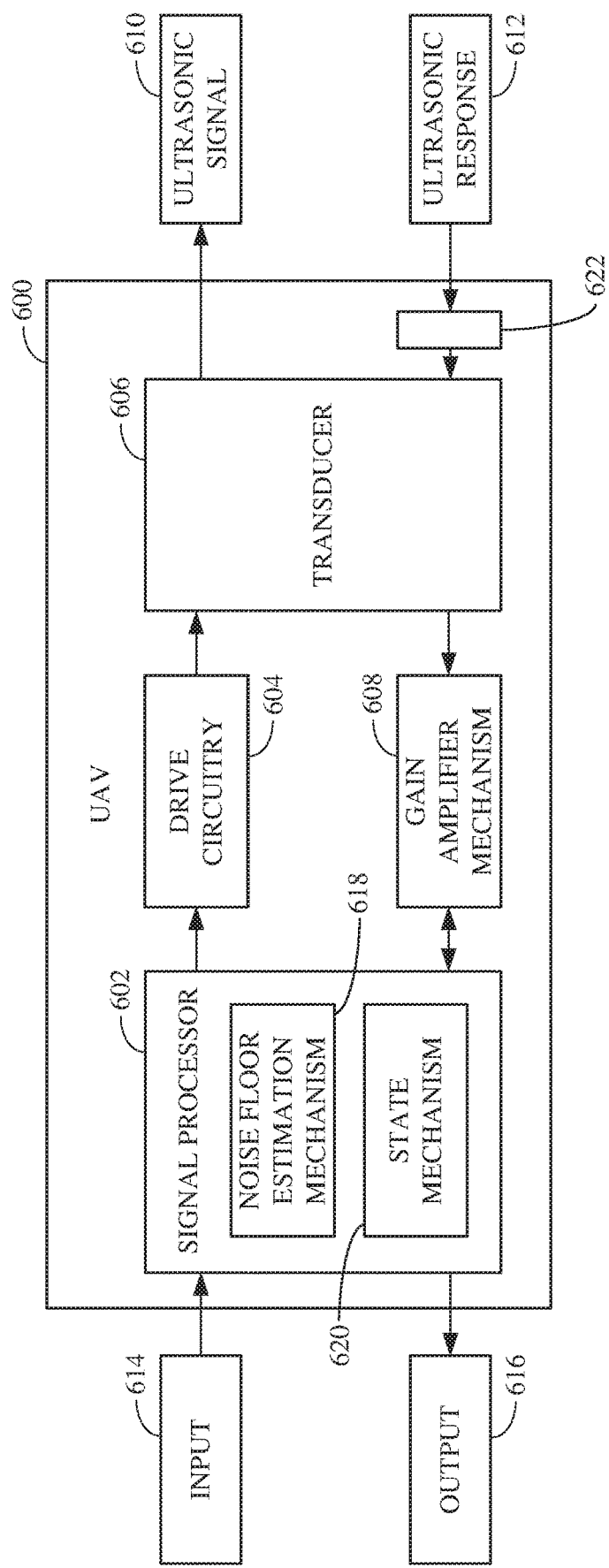
FIG. 6 is a block diagram illustrating an example of components of a UAV.

FIG. 6 is a block diagram illustrating an example of components of a UAV 600. The UAV 600 may, for example, be the UAV 304 shown in FIG. 3. The UAV 600 includes a signal processor 602, drive circuitry 604, a transducer 606, and a gain amplifier mechanism 608. The transducer 606 may, for example, be the transducer 306 shown in FIG. 3. The transducer 606 is configured to transmit an ultrasonic signal 610 and receive an ultrasonic response 612 to the ultrasonic signal 610 using a gain value. The ultrasonic signal 610 and the ultrasonic response 612 may, for example, respectively be the ultrasonic signal 300 and the ultrasonic response 302 shown in FIG. 3.

The signal processor 602 includes hardware and/or software components configured to process input 614 to and output 616 from the UAV 600. The signal processor 602 includes a noise floor estimation mechanism 618 and a state mechanism 620. The noise floor estimation mechanism 618 is configured to determine a noise floor estimate for the gain value used by the transducer 606 to receive the ultrasonic response 612. For example, the noise floor estimation mechanism 618 can include functionality for performing operations for determining the noise floor estimate, such as described at 402 in FIG. 4.

The state mechanism 620 is configured to set an ultrasonic ranging state used by the transducer 606 based on the ultrasonic response 612 to the ultrasonic signal 610. For example, the state mechanism 620 can include functionality for performing operations for determining whether to change the ultrasonic ranging state of the UAV 600, such as described at 410, 414, and/or 416 in FIG. 4. For example, the ultrasonic ranging state of the UAV 600 may initially be set to a long detect state. The state mechanism 620 may set the ultrasonic ranging state to a short detect state responsive to a determination that a target value included in the ultrasonic response 612 to the ultrasonic signal 610 is inside of a ring-down window associated with the transducer 606.

The signal processor 602 may, for example, include a microcontroller (e.g., an IC) including a processor coupled to a memory, such as for example, the processor 202 and the storage 204 shown in FIG. 2. For example, the microcontroller can include functionality for controlling operations performed by the components of the UAV 600 and the storage 204 (or other memory, as applicable) can include instructions executable to perform those operations. For example, the instructions stored in the storage 204 (or other memory) can include instructions comprising the noise floor estimation mechanism 618 and the state mechanism 620.

The input 614 may include information usable to determine a noise floor estimate, adjust a gain value, change an ultrasonic ranging state, or the like. For example, the input 614 may include data indicative of a position and/or orientation of the UAV 600. For example, where the input 614 indicates a sudden shift in the position or angular change in orientation of the UAV 600, the gain value to be used by the transducer 606 can be adjusted before the ultrasonic signal 610 is transmitted to compensate for that shift.

In another example, the input 614 may include data indicative of an ascent or descent motion of the UAV 600. For example, as the UAV 600 ascends, the object from which the ultrasonic response 612 may be received becomes increasingly farther away from the UAV 600, causing the gain value to potentially become too weak to detect the ultrasonic response 612. The rate at which the UAV 600 is ascending can be calculated, and an offset to the gain value can be calculated based on that rate. That offset can be applied, such as by the state mechanism 620, upon the processing of target values included in the ultrasonic response 612.

The output 616 may include data indicative of adjustments of gain values used by the transducer 606, changes in the ultrasonic ranging state of the UAV 600, or other information. For example, the output 616 may include a report of distances measured between the UAV 600 and one or more objects from which the ultrasonic response 612 is, or a plurality of ultrasonic responses are, received. For example, the output 616 may be reported to a server in communication with the UAV 600 (e.g., using a communications module, such as the communications module 214 shown in FIG. 2). In another example, the output 616 may be retrieved, such as using a secondary storage device removably inserted to a port of the UAV 600.

The drive circuitry 604 includes hardware and/or software components configured to cause the transducer 606 to transmit the ultrasonic signal 610. For example, the drive circuitry 604 may include a printed circuit board (PCB), electronics for powering the transducer 606, or the like, or a combination thereof.

The gain amplifier mechanism 608 is configured to adjust the gain value used by the transducer 606. The gain amplifier mechanism 608 may, for example, include an AFE. The gain amplifier mechanism 608 can adjust the gain value responsive to a determination that the ultrasonic response 612 does not include a target value or a determination that a target value included in the ultrasonic response 612 causes a count threshold to be exceeded. Alternatively, the gain amplifier mechanism 608 can adjust the gain value responsive to a determination by the signal processor 602 (e.g., using the state mechanism 620) as to whether the ultrasonic response 612 to the ultrasonic signal 610 includes a target value inside of a ring-down window associated with the transducer 606. As a further alternative, the gain amplifier mechanism 608 may adjust the gain value used by the transducer 606 to transmit the ultrasonic signal 610 upon a change in the ultrasonic ranging state, such as by the state mechanism 620.

The UAV 600 includes an energy-absorbing body component 622 that prevents or otherwise reduces a likelihood of a use of a secondary reflection target value to set the ultrasonic ranging state. The energy-absorbing body component 622 can be a sound-absorbing material that reduces the strength of secondary reflections. The energy-absorbing body component 622 may, for example, be used in tandem with operations for detecting secondary reflection target values (e.g., as described at 510 in FIG. 5) to prevent inaccurate measurements from being used to adjust gain values or change an ultrasonic ranging state.

Implementations of the UAV 600 may include additional, fewer, or different components than shown in FIG. 6. In some implementations, the transducer 606 may be or otherwise include multiple transducers. For example, the UAV 600 can include a first transducer for transmitting the ultrasonic signal 610 and a second transducer for receiving the ultrasonic response 612. For example, the drive circuitry 604 may act only on the first transducer, whereas receive circuitry (not shown) for processing the ultrasonic response 612 may be acted upon only by the second transducer.

In some implementations, the UAV 600 may include receive circuitry. For example, the receive circuitry may include hardware and/or software components configured to communicate the ultrasonic response 612 received using the transducer 606 to the signal processor 602. The receive circuitry 610 may also be configured to instruct the first transducer 606 and the second transducer 608 to receive ultrasonic signals. For example, the receive circuitry may include a PCB, a filter for processing ultrasonic responses received using the transducer 606, or the like, or a combination thereof.

Figure 7:
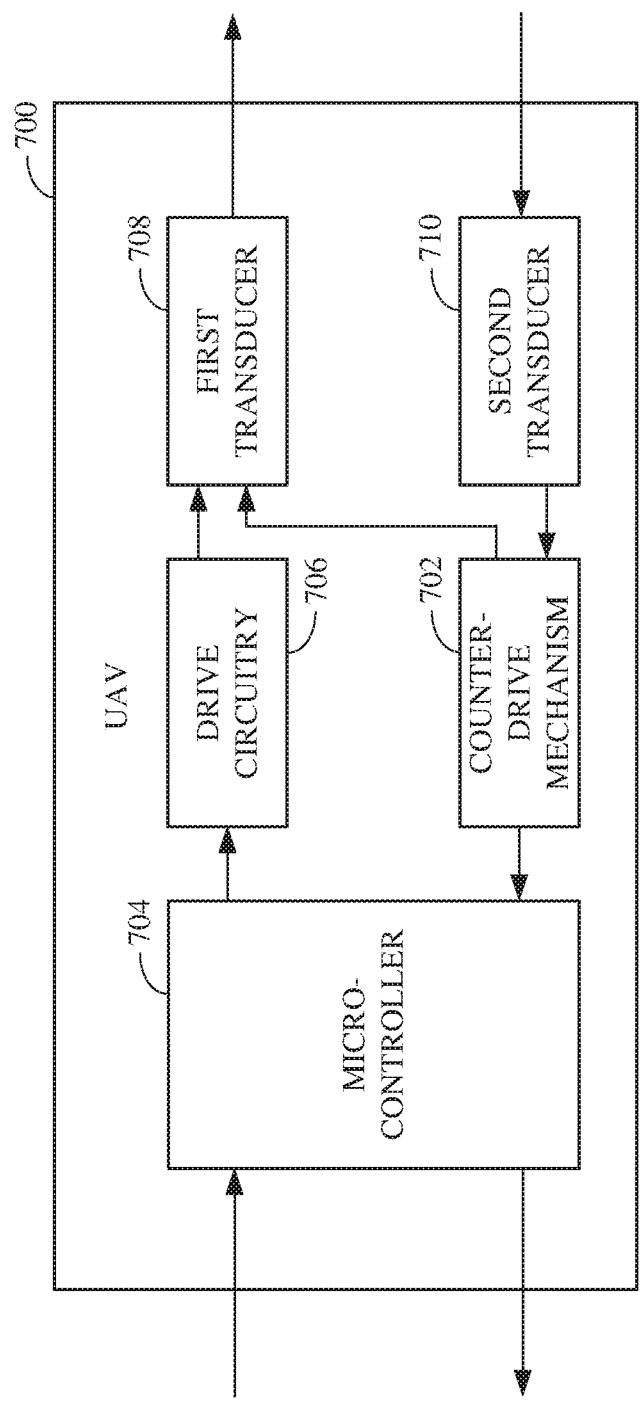
FIG. 7 is a block diagram illustrating an example of a UAV including a counter-drive mechanism.

FIG. 7 is a block diagram illustrating an example of a UAV 700 including a counter-drive mechanism 702. The UAV 700 further includes a microcontroller 704, drive circuitry 706, a first transducer 708, and a second transducer 710. The microcontroller 704 and the drive circuitry 706 may, for example, respectively be the signal processor 602 and the drive circuitry 604 shown in FIG. 6. One or both of the first transducer 708 or the second transducer 710 may, for example, be the transducer 606 shown in FIG. 6. For example, the first transducer 708 may be configured to transmit an ultrasonic signal and the second transducer 710 may be configured to receive an ultrasonic response.

The counter-drive mechanism 702 is configured to reduce a ring-down time for the first transducer 708. For example, it may be expected that the ultrasonic response received responsive to an ultrasonic signal includes artefacts that could reduce the accuracy of the target value detection by the components of the UAV 700. As such, the counter-drive mechanism 702 may, at least in some cases, be configured to operate for each ultrasonic response received. In another example, the counter-drive mechanism 702 may reduce the ring-down time responsive to a determination that feedback of an ultrasonic signal exceeds a saturation threshold. For example, the counter-drive mechanism 702 can include functionality for performing operations for detecting feedback exceeding a saturation threshold and responsively reducing a ring-down time, such as described at 506 and 508 in FIG. 5. The counter-drive mechanism 702 can implement a feedback path for the first transducer 708 to detect a state thereof. Upon saturation being detected (e.g., based on the saturation threshold being exceeded), the counter-drive mechanism 702 can implement a control loop to actively drive the first transducer 708 to rest (e.g., using an inverted signal). For example, the counter-drive mechanism 702 can be or otherwise include a proportional-integral-derivative controller.

Implementations of the UAV 700 may include additional, fewer, or different components than shown in FIG. 7. In some implementations, the first transducer 708 and the second transducer 710 each transmit an ultrasonic signal and receive an ultrasonic response. For example, each of the first transducer 708 and the second transducer 710 can operate on different frequencies, such that they are tuned to a particular channel in order to prevent or at least mitigate a risk of signal interference. The first transducer 708 and the second transducer 710 can operate on alternating pings. For example, the first transducer 708 can transmit an ultrasonic signal while the second transducer 710 receives an ultrasonic response. This may effectively double the refresh rate for the UAV 700. In some implementations, there may be two pairs of transducers, where each pair of transducers includes a transmitting transducer and a receiving transducer, and each pair of transducers operates on a different frequency.

In some implementations, the counter-drive mechanism 702 can also be used to manage the driving of the first transducer 708. For example, a transducer is very resonant and may have a resonant frequency that differs slightly from stated standards therefor (e.g., due to differences in the manufacturing process of transducers). The feedback control of the counter-drive mechanism can be used to drive the first transducer 708 at a frequency at which it attains a highest energy output level.

Figure 8:
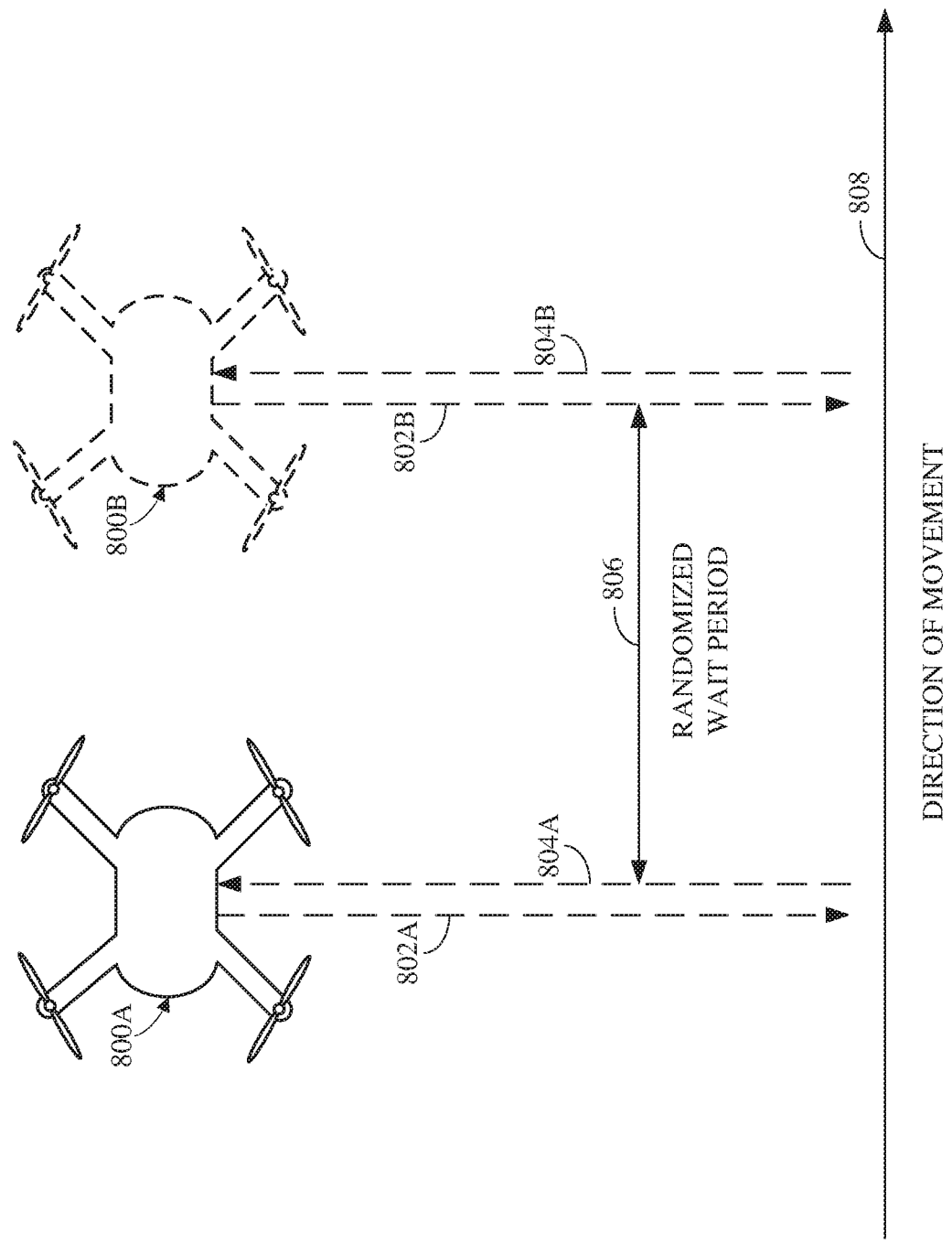
FIG. 8 shows an example of a cadence for transmitting ultrasonic signals from a UAV.

FIG. 8 shows an example of a cadence for transmitting ultrasonic signals from a UAV 800A, 800B. The UAV 800A shows a UAV at a first time during operation. The UAV 800A (e.g., using a transducer thereof) transmits an ultrasonic signal 802A and responsively receives an ultrasonic response 804A. The UAV 800B shows the same UAV at a second time during operation, such as after a randomized wait period 806. The randomized wait period 806 can be a randomized period of time, such as determined by a signal processor of the UAV 800A (e.g., the signal processor 602 shown in FIG. 6). The UAV flies along a direction of movement 808, such that the UAV 800A is at a first location and the UAV 800B is at a second location.

For example, the signal processor may include functionality for delaying a transmission of a subsequent ultrasonic signal 802B (and thus a receipt of a subsequent ultrasonic response 804B) by the transducer by a randomized period of time. This may be beneficial, for example, in situations where multiple UAVs operate in close proximity to one another. For example, it may be possible for an ultrasonic response to an ultrasonic signal transmitted from a first UAV to be received by a second UAV. The second UAV would not correctly process the target values thereof since they do not accurately represent the objects reflecting the ultrasonic signal transmitted by the second UAV. Further, each of the UAVs may receive two sets of ultrasonic responses and not be able to determine which corresponds to the ultrasonic signal it transmitted. For example, the first and second UAVs may be transmitting their respective ultrasonic signals at the same or a similar rate.

As such, the randomized wait period 806 can be used to create a cadence for transmitting ultrasonic signals, where that cadence is associated only with the UAV that transmits those ultrasonic signals. After a UAV transmits an ultrasonic signal begins listening to receive an ultrasonic response thereto, the randomized wait period 806 can be introduced as a delay before the UAV is able to transmit a subsequent ultrasonic signal. The randomized wait period 806 can include a number of milliseconds randomly selected, such as using an IC of the UAV.

Using the randomized wait period 806, a UAV would know to act only using ultrasonic responses that correspond to the ultrasonic signals it transmitted. This is because the ultrasonic responses to ultrasonic signals transmitted by a different UAV would appear to be at different locations over time. Contrastingly, however, the UAV could detect its ultrasonic responses because they would follow along a set location pattern over time. For example, an IC of the UAV may include functionality for temporally filtering a series of target values to determine where locations thereof should fall if they are in fact responsive to ultrasonic signals transmitted by that UAV. For example, the IC can determine statistical likelihoods that readings returned to the UAV are an actual target value, a false target value (e.g., a reflection based on an ultrasonic signal transmitted by a different UAV), or other measurements, such as noise.

Where certain elements of these implementations may be partially or fully implemented using known components, only those portions of such known components that are necessary for an understanding of this disclosure have been described. Detailed descriptions of other portions of such known components have been omitted so as not to obscure the disclosure.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLDs), reconfigurable computer fabrics (RCFs), SoCs, application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet'), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are in terms of a specific sequence of steps of a method, these descriptions are only illustrative of the broader methods of the disclosure and may be modified as required by the particular applications thereof. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A method for ultrasonic ranging state management for an unmanned aerial vehicle, the method comprising:
   determining a noise floor estimate for gain values for a transducer of the unmanned aerial vehicle based on a binary search performed over a gain space;
   setting an ultrasonic ranging state of the unmanned aerial vehicle to a long detect state;
   transmitting an ultrasonic signal from the transducer of the unmanned aerial vehicle;
   receiving, by the transducer, an ultrasonic response to the ultrasonic signal using a gain value of the gain values;
   determining whether the ultrasonic response to the ultrasonic signal includes a target value;
   responsive to determining that the ultrasonic response to the ultrasonic signal includes the target value, determining whether the target value is inside of a ring-down window associated with the transducer; and
   responsive to determining that the target value is inside of the ring-down window, setting the ultrasonic ranging state of the unmanned aerial vehicle to a short detect state.

2. The method of claim 1, wherein determining the noise floor estimate for the gain values for the transducer of the unmanned aerial vehicle based on the binary search performed over the gain space comprises:
   determining a value of the gain space at which an analog-to-digital signal value meets a threshold; and
   determining an offset for the value of the gain space based on a difference between the value of the gain space and the analog-to-digital signal value.

3. The method of claim 1, wherein the noise floor estimate is a first noise floor estimate, wherein the method further comprises:
   responsive to determining that the ultrasonic response to the ultrasonic signal does not include the target value, increasing the gain value used for receiving the ultrasonic response; and
   determining a second noise floor estimate for the gain values of the unmanned aerial vehicle, wherein the second noise floor estimate is used to verify the gain value responsive to the increasing.

4. The method of claim 1, wherein the noise floor estimate is a first noise floor estimate, wherein the method further comprises:
   responsive to determining that the target value causes a count of target values to exceed a count threshold, decreasing the gain value used for receiving the ultrasonic response; and
   determining a second noise floor estimate for the gain values of the unmanned aerial vehicle, wherein the second noise floor estimate is used to verify the gain value responsive to the decreasing.

5. The method of claim 1, wherein the gain value is a first gain value, wherein the method further comprises:
   responsive to determining that the target value is not inside of the ring-down window, adjusting the first gain value to a second gain value according to the noise floor estimate.

6. The method of claim 1, further comprising:
increasing one of a burst count or a voltage used by the transducer to transmit the ultrasonic signal based on a speed of the unmanned aerial vehicle exceeding a Doppler shift threshold.

7. The method of claim 1, further comprising:
reducing a ring-down time for the transducer.

8. The method of claim 1, wherein the noise floor estimate is a first noise floor estimate, wherein the method further comprises:
determining a second noise floor estimate for the gain values of the unmanned aerial vehicle based on a staleness period of the first noise floor estimate expiring.

9. An unmanned aerial vehicle, comprising:
a transducer configured to transmit an ultrasonic signal and receive an ultrasonic response to the ultrasonic signal using a gain value; and
a signal processor including a noise floor estimation mechanism and a state mechanism,
wherein the noise floor estimation mechanism is configured to determine a noise floor estimate for gain values for the transducer based on a binary search performed over a gain space, the gain values including the gain value,
wherein the state mechanism is configured to set an ultrasonic ranging state used by the transducer based on the ultrasonic response to the ultrasonic signal, and
wherein the gain value used by the transducer to receive the ultrasonic response to the ultrasonic signal is adjusted based on the ultrasonic ranging state set by the state mechanism.

10. The unmanned aerial vehicle of claim 9, wherein the ultrasonic ranging state is initially set to a long detect state and the state mechanism sets the ultrasonic ranging state to a short detect state responsive to a determination that a target value included in the ultrasonic response to the ultrasonic signal is inside of a ring-down window associated with the transducer.

11. The unmanned aerial vehicle of claim 9, further comprising:
a gain amplifier mechanism configured to adjust the gain value used by the transducer responsive to a determination that the ultrasonic response to the ultrasonic signal does not include a target value inside of a ring-down window associated with the transducer.

12. The unmanned aerial vehicle of claim 9, further comprising:
an energy-absorbing body component that prevents a use of a secondary reflection target value to set the ultrasonic ranging state.

13. The unmanned aerial vehicle of claim 9, further comprising:
a counter-drive mechanism configured to reduce a ring-down time for the transducer.

14. The unmanned aerial vehicle of claim 9, wherein the signal processor includes functionality for delaying a transmission of a subsequent ultrasonic signal by the transducer by a randomized period of time.

15. A non-transitory computer-readable storage medium, comprising processor-executable routines that, when executed by a processor, facilitate a performance of operations comprising:
obtaining a noise floor estimate for an unmanned aerial vehicle by performing a binary search over a gain space delimited by a minimum gain value and a maximum gain value;
instructing a transducer of the unmanned aerial vehicle to transmit an ultrasonic signal; and
changing an ultrasonic ranging state of the unmanned aerial vehicle based on an ultrasonic response to the ultrasonic signal, the ultrasonic response received using a gain value corresponding to the noise floor estimate.

16. The non-transitory computer-readable storage medium of claim 15, wherein the operations for changing the ultrasonic ranging state of the unmanned aerial vehicle based on the ultrasonic response to the ultrasonic signal comprise:
determining that a target value included in the ultrasonic response to the ultrasonic signal is inside of a ring-down window associated with the transducer.

17. The non-transitory computer-readable storage medium of claim 15, the operations further comprising:
adjusting the gain value responsive to determining that a count of target values included in the ultrasonic response to the ultrasonic signal exceeds a count threshold.

18. The non-transitory computer-readable storage medium of claim 15, the operations further comprising:
adjusting the gain value responsive to determining that the ultrasonic response to the ultrasonic signal does not include a target value.

19. The non-transitory computer-readable storage medium of claim 15, the operations further comprising:
determining that the ultrasonic response to the ultrasonic signal includes a secondary reflection target value; and
determining to change the ultrasonic ranging state of the unmanned aerial vehicle without considering the secondary reflection target value.

* * * * *